US008638189B2

United States Patent
Cha et al.

(10) Patent No.: US 8,638,189 B2
(45) Date of Patent: Jan. 28, 2014

(54) AIR CONDITIONER SYSTEM AND METHOD FOR CONTROLLING THE SAME

(75) Inventors: Byoung Keun Cha, Geumcheon-gu (KR); Duck Gu Jeon, Geumcheon-gu (KR); Jae Sik Jung, Geumcheon-gu (KR); Jong Hyun Han, Geumcheon-gu (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 13/042,361

(22) Filed: Mar. 7, 2011

(65) Prior Publication Data

US 2011/0218682 A1 Sep. 8, 2011

(30) Foreign Application Priority Data

Mar. 8, 2010 (KR) .................. 10-2010-0020330

(51) Int. Cl.
*G05B 23/00* (2006.01)

(52) U.S. Cl.
USPC ........... 340/3.32; 340/3.1; 340/3.3; 340/3.42; 340/3.41; 340/3.43; 340/4.11; 700/276

(58) Field of Classification Search
USPC ............... 340/4.11, 3.1, 3.3, 3.32, 3.42, 3.43; 700/276
See application file for complete search history.

(56) References Cited

U.S. PATENT DOCUMENTS

| 7,564,804 | B2 * | 7/2009 | Lee .................. 370/255 |
| 8,087,257 | B2 * | 1/2012 | Kim et al. ............. 62/129 |
| 2001/0048376 | A1 * | 12/2001 | Maeda et al. ........ 340/870.17 |
| 2004/0049320 | A1 | 3/2004 | Takai et al. |
| 2007/0157644 | A1 * | 7/2007 | Kim et al. .............. 62/157 |
| 2008/0195254 | A1 * | 8/2008 | Jung et al. ............. 700/276 |

FOREIGN PATENT DOCUMENTS

| EP | 1 956 760 A1 | 8/2008 |
| EP | 2 264 374 A1 | 12/2010 |
| WO | WO 2009/118877 A1 | 10/2009 |

OTHER PUBLICATIONS

Hau-Ren Lu et al: "On-line Load Optimization for Two Way Load Management System", Man and Cybernetics, 2006. ICSMC'06. IEEE International Conference on, IEEE, PI, Oct. 1, 2006, pp. 3250-3255, XP031117449 ISBN:978-1-4244-0099-7 p. 3250, section "I. Introduction" p. 3251, section "II. Two Way Load Management System" p. 3251. section "III. Real Time Two Way Direct Load Control" figure 1.

* cited by examiner

*Primary Examiner* — Daniel Wu
*Assistant Examiner* — Benyam Haile
(74) *Attorney, Agent, or Firm* — McKenna Long & Aldridge LLP

(57) ABSTRACT

The present invention relates to a system for controlling an air conditioner and method for controlling the same, and more particularly, to a system for controlling an air conditioner and method for controlling the same which can make real time control for maintaining system reliability, can make real time control of air conditioners while minimizing a network load to minimize a load on a server, and can prevent transmission and reception delay of a data.

6 Claims, 4 Drawing Sheets

(a)

(b)

AIR CONDITIONER SYSTEM AND METHOD FOR CONTROLLING THE SAME

CROSS REFERENCE TO RELATED APPLICATION

This application claims the benefit of the Patent Korean Application No. 10-2010-0020330, filed on Mar. 8, 2010, which is hereby incorporated by reference as if fully set forth herein.

BACKGROUND OF THE DISCLOSURE

1. Field of the Disclosure

The present invention relates to a system for controlling an air conditioner and method for controlling the same, and more particularly, to a system for controlling an air conditioner having at least one outdoor unit and at least one indoor unit connected to the outdoor unit, to which a data collecting gateway and a data collecting server are provided for a user to make real time monitoring of state information or operation information on the outdoor unit or the indoor unit as well as to make real time control of the air conditioning system; and a method for controlling the same.

2. Discussion of the Related Art

In general, an air conditioner is an appliance for cooling or heating a room or cleaning air in the room for making a room environment more comfortable to the user. In the air conditioners, there are separate type air conditioners and package type air conditioners. Though identical in view of functions, the separate type air conditioner has functions of the package type air conditioner separated into an indoor unit and an outdoor unit. Especially, since the separate type air conditioner allows plural connection of the air conditioners, the separate type air conditioner is versatile.

Recently, as use of the air conditioners increases sharply, multi-air conditioners are being installed, each of which has the indoor unit installed in every room of a house, or in every office in a building and an outdoor unit to which the indoor units are connected in common.

Basically, an air conditioning system including the multi-air conditioner is provided with the multi-air conditioner having at least one indoor unit and at least one outdoor unit to which the indoor units are connected in common, and a controller connected to each of the outdoor units installed in the building for monitoring states of the outdoor units and the indoor units and controlling operation of the outdoor units and the indoor units, integrally or individually.

Therefore, since the outdoor unit detects the state information, operation information or setting information on the outdoor unit and the indoor units and forwards the same to the controller, if the user inputs a room cooling order to one of the indoor units directly, the controller can notice the state and the setting information on the indoor unit connected to one of the outdoor units, thereby enabling to forward a control order to the outdoor unit for adjusting a condensing extent of refrigerant, accordingly.

The air conditioning system can be provided with a local controller for detecting the operation state of a plurality of multi-air conditioners and controlling the same through a gateway according to a result of detection.

The local controller can be a general PC (Personal Computer) or a dedicated controller, provided with the gateway which is a device for collecting and re-forwarding information between the general PC or the dedicated controller and the plurality of multi-air conditioners.

In a related art air conditioning system, the gateway collects the state information on the indoor units (names of the indoor units, setting temperatures, room temperatures, whether the indoor unit is running or not, and modes) from the air conditioners at a field once per every hour, and forwards the information to a data collection server located far from the gateway.

The information forwarding is made non-synchronically by all of the gateways at the field installed throughout an entire country according to individual operation times, and the data collection server analyzes a data received thus, stores in a data base, and allows the user to access to a web through the Internet from anywhere in the country to determine the state information on the indoor unit at the field.

In the meantime, with regard to the control of the air conditioning system, if the user gives the control orders through a remote control unit, the system receives the control orders in succession at the data base, and, upon reception of a monitoring signal on a facility thereafter, determines whether the data base has a control order relevant to the facility or not. And, if the data base has the control order, the system forwards the control order to the facility. Accordingly, control signals are received/transmitted in synchronization with monitoring periods.

A related art remote monitoring method of the system has the following problems.

First, no real time control is available at the related art system. That is, since the control signal is transmitted/received synchronized with the monitoring periods, it is required to wait one hour of monitoring period at the maximum for controlling the air conditioning system, thereby permitting no real time control data transmission.

Second, different control orders given in succession for controlling the system can not have time differences since control orders are not executed in real time. That is, the different orders transmitted in succession can be executed instantly regardless of control times given, causing the control order transmitted at last to be executed while the control order transmitted at first to be disregarded.

SUMMARY OF THE DISCLOSURE

Accordingly, the present invention is directed to a system for controlling an air conditioner and method for controlling the same.

An object of the present invention is to provide a system for controlling an air conditioner to which a gateway and a data collecting server are provided for collecting state information or operation information on at least one of outdoor units and indoor units thereof at preset periods for a user to make real time cycle data monitoring as well as for the data collection server to transmit the control signal to the gateway in synchronization with a control sensing signal from the gateway, thereby enabling real time control of the air conditioning system; and a method for controlling the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a system for controlling an air conditioner, comprises a gateway for transmitting at first time periods at least one of state information and operation information concerning at least one of an outdoor unit and an indoor unit of the air conditioner and for transmitting at second time periods a control sensing signal for sensing a control order for controlling the air conditioner, wherein the first time periods are different from the second time periods and a data collecting server for receiving the control sensing signal and the at least one of state information and operation information and for transmitting a control signal to the gateway in response to the control sensing signal if the control order is sensed.

In another aspect of the present invention, a method for controlling an air conditioner, comprising the steps of: transmitting at least one of state information and operation information concerning at least one of an outdoor unit and an indoor unit of the air conditioner, wherein the information is transmitted at first time periods through a gateway associated with the air conditioner; transmitting a control sensing signal for sensing a control order for controlling the air conditioner, wherein the control sensing signal is transmitted through the gateway at second times periods different from the first time periods; and receiving, at the gateway, a control signal in response to the transmission of the control sensing signal if the control order is sensed.

In another aspect of the present invention, a method for controlling an air conditioner, comprising the steps of: receiving at least one of state information and operation information concerning at least one of an outdoor unit and an indoor unit of the air conditioner, wherein the information is received at first time periods by a data collecting server; receiving a control sensing signal for sensing a control order for controlling the air conditioner, wherein the control sensing signal is received by the data collecting server at second time periods different from the first time periods; and transmitting, by the data collecting server, a control signal in response to the receiving of the control sensing signal if the control order is sensed.

Thus, the system for controlling an air conditioner and the method for controlling the same of the present invention have the following advantages.

First, the provision of the data collection and control gateway and the data collecting server enables the user to control the system for controlling an air conditioner in real time.

Second, the transmission of the control sensing signal from the gateway to the data collecting server at short and fixed periods for processing the control signal and the transmission of the control signal from the data collecting server to the gateway in synchronization with the control sensing signal enables to maintain real time controllability for reducing a network connection load of the server while making real time control of the air conditioning system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
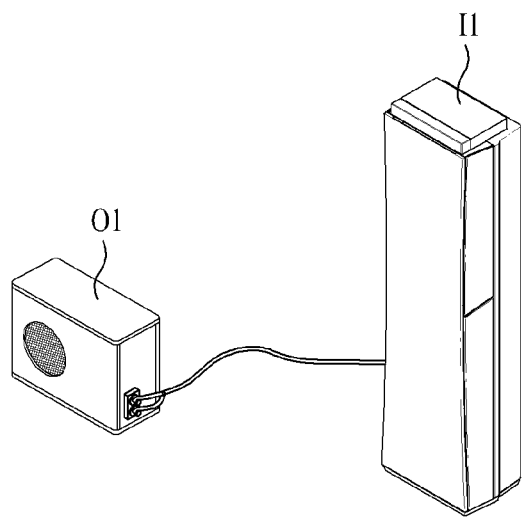
FIGS. 1A and 1B illustrate schematic views each showing an air conditioner in a system for controlling an air conditioner in accordance with a preferred embodiment of the present invention.
Figure 1:
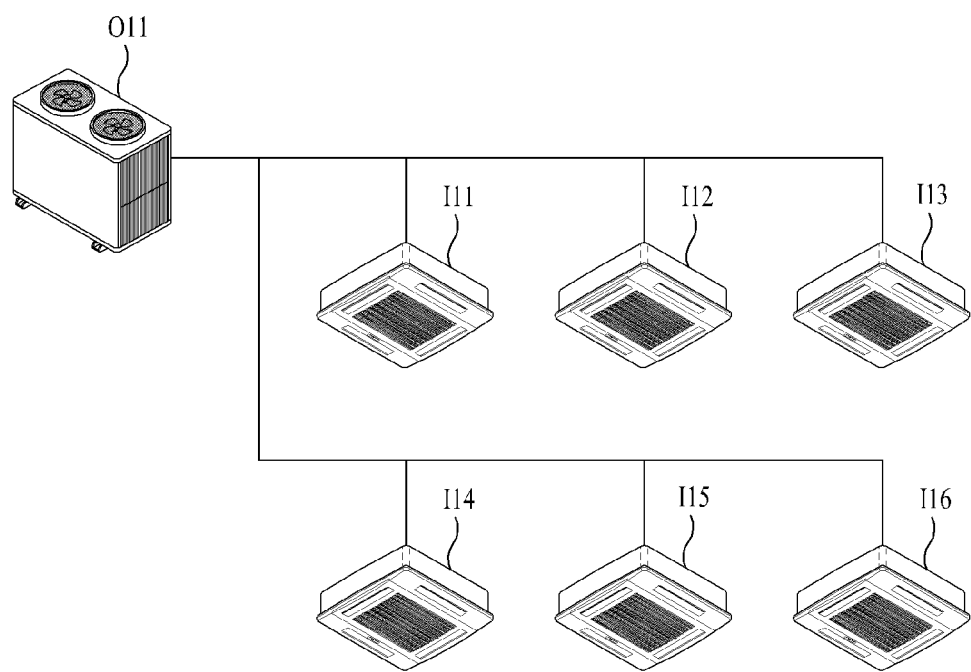

FIGS. 1A and 1B illustrate schematic views each showing a system for controlling an air conditioner in accordance with a preferred embodiment of the present invention. FIG. 1A illustrates a perspective view of a stand type air conditioner having an indoor unit and an outdoor unit and FIG. 1B illustrates a schematic view of a ceiling type air conditioner having one outdoor unit and a plurality of indoor units.

It is apparent that the air conditioner of the present invention can be the stand type, the ceiling type, a wall mounting type, or a package type in which the outdoor unit and the indoor unit are unified, and is not limited to ones shown in the drawings.

Referring to FIG. 1A, the air conditioner includes an outdoor unit, and at least one indoor unit connected to the outdoor unit. The indoor unit I1 and the outdoor unit O1 are connected with a refrigerant pipe, and the indoor unit can cool or heat a space in which the indoor unit is installed depending on direction of circulation of the refrigerant.

Referring to FIG. 1B, the air conditioner can include a plurality of indoor units I11~I16 and at least one outdoor unit O11 connected to the plurality of indoor units. The plurality of indoor units and the outdoor unit are connected, not only with refrigerant pipes, but also with communication lines for transmission and reception of control signals based on a predetermined communication system.

The system for controlling an air conditioner includes a remote control unit (not shown) for controlling the plurality of indoor units and the outdoor unit, additionally. And, the system for controlling an air conditioner can include a local controller (not shown) additionally which can communicate with the indoor units, receive a user's order, and forward operation states of the indoor units. Besides the indoor units and the outdoor unit, the system for controlling an air conditioner can include various air conditioning units, such as a ventilation unit, an air cleaning unit, a humidifying unit, a dehumidifying unit, and a heater, additionally. And, the system for controlling an air conditioner can have the remote control unit with a lighting unit and an alarming unit connected thereto which are operative in relation to the air conditioner.

Each of the indoor units I1, I11~I16 includes an indoor heat exchanger (not shown) installed in a room for cooling or heating the room, a fan (not shown) mounted to one side of the indoor heat exchanger for accelerating heat dissipation from the refrigerant, a plurality of sensors (not shown, for an example, a temperature sensor and/or a humidity sensor), and a control unit (not shown) for controlling operation of the indoor unit.

Each of the indoor units I1, I11~I16 includes at least one air inlet for drawing external air, at least one air outlet for discharging heat exchanged air to an outside of the indoor unit. The air outlet can have a wind direction adjusting means (for an example, a vane or louver) provided thereto for opening or closing the air outlet and guiding a direction of air being discharged. The indoor unit controls a rotation speed of the fan for controlling an air flow rate by controlling air being drawn or discharged. And, the indoor unit can have body perceiving means for detecting a body present to the room, additionally.

And, each of the indoor unit I1, I11~I16 can include a display unit for displaying an operation state and setting information of the indoor unit, and an input unit for inputting a control order thereto, additionally. An indoor unit body can be connected to the local controller with wire or wireless, for setting operation and changing the operation state thereof according to a control order from the local controller, and displaying the operation state through the local controller.

The outdoor unit O1 or O11 is operative in a cooling mode or a heating mode and supplies refrigerant to the plurality of indoor units in response to requirement from the indoor unit connected thereto or an external control order.

The outdoor unit O1 or O11 includes a compressor for compressing the refrigerant, a compressor motor for driving the compressor, an outdoor heat exchanger for dissipating heat from the refrigerant compressed thus, an outdoor fan arranged on one side of the outdoor heat exchanger for accelerating the heat dissipation from the refrigerant, an expansion unit for expanding condensed refrigerant, a cooling/heating change-over valve for changing a flow passage of compressed refrigerant, and an accumulator for temporary storage of gasified refrigerant for supplying refrigerant of a fixed pressure to the compressor after removing moisture and foreign matter from the refrigerant. Besides, the outdoor unit can include a plurality of sensors, valves, and overcooling unit and so on additionally, of which description will be omitted.

The outdoor unit O1 or O11 is operated in response to requirement from at least one of the indoor units connected thereto or the control order from the remote control unit, and a number of the outdoor units in operation and a number of the compressors mounted to the indoor units in operation can vary with variation of a cooling or heating capacity of the indoor units in operation.

Figure 2:
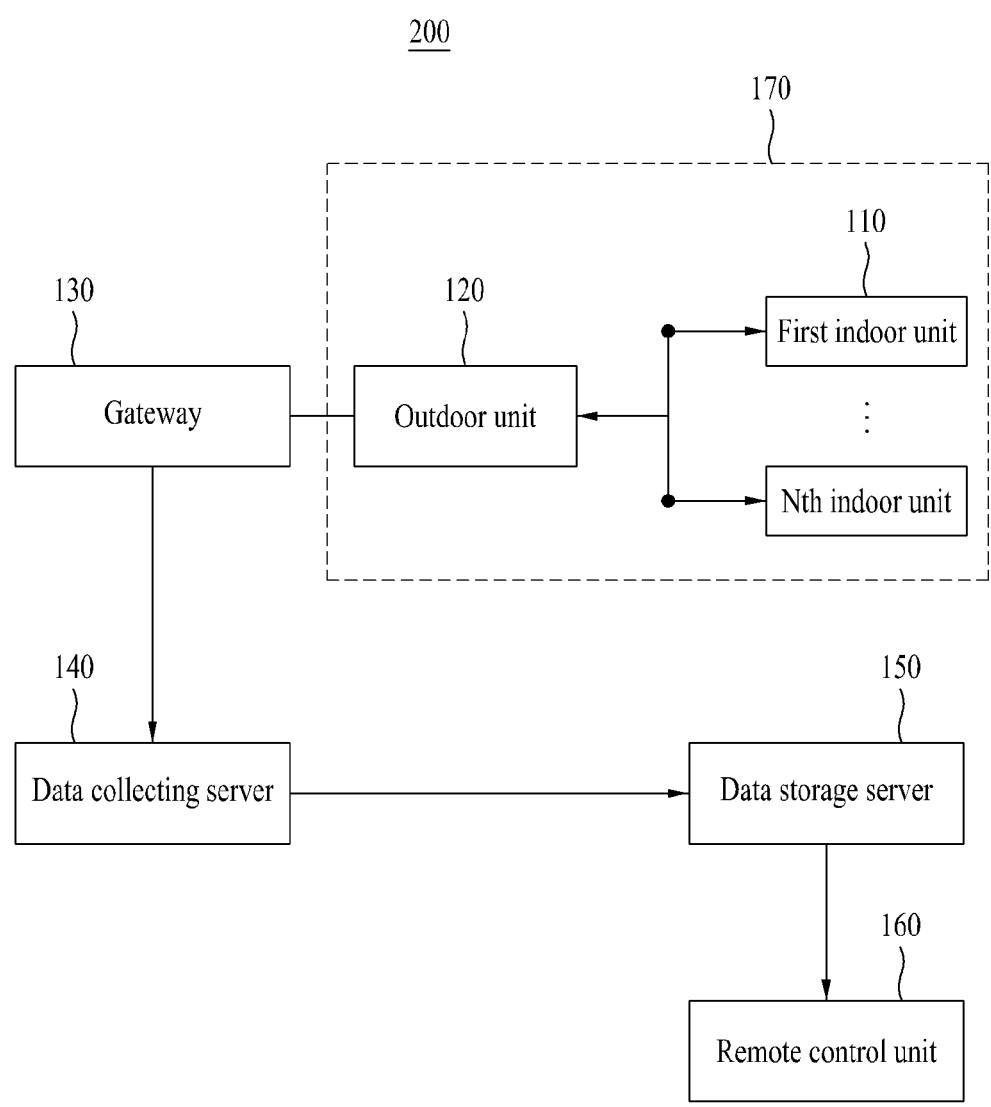
FIG. 2 illustrates a block diagram of a system for controlling an air conditioner in accordance with a preferred embodiment of the present invention.

FIG. 2 illustrates a block diagram of a system for controlling an air conditioner in accordance with a preferred embodiment of the present invention.

The system for controlling an air conditioner 100 in accordance with a preferred embodiment of the present invention includes a gateway 130 for transmitting at first time periods at least one of state information and operation information concerning at least one of an outdoor unit and an indoor unit of the air conditioner and for transmitting at second time periods a control sensing signal for sensing a control order for controlling the air conditioner, wherein the first time periods are different from the second time periods; and a data collecting server 140 for receiving the control sensing signal and the at least one of state information and operation information and for transmitting a control signal to the gateway in response to the control sensing signal if the control order is sensed.

The system for controlling an air conditioner 100 in accordance with a preferred embodiment of the present invention includes an outdoor unit 120, at least one indoor unit 110 connected to the outdoor unit 120, a gateway 130 for collecting state information or operation information on at least one of the outdoor unit 120 and the indoor unit 110 and forwarding a control sensing signal at preset first periods for determining reception of the control order, a data collecting server 140 for receiving information collected at the gateway 130 at preset second periods and transmitting the control signal to the gateway 130 in synchronization with the control sensing signal upon reception of a control order, and a remote control unit 160 for displaying information from the data collecting server 140, and applying the control order to the data collecting server 140.

Referring to FIG. 2, the system for controlling an air conditioner 100 can include an air conditioner having at least one outdoor unit 120, and at least one indoor unit 110 connected to the outdoor unit 120, a gateway 130 for collecting state information or operation information on at least one of the outdoor unit 120 and the indoor unit 110 and transmitting the same to a data collecting server 140, the data collecting server 140 for analyzing a data received thus and transmitting the same to a data storage server 150, the data storage server 150 for receiving and storing the data received thus at a data base, and a remote control unit 160 for retrieving and forwarding the data stored thus.

And, the second period can be set shorter than the first period. For an example, the second period can be 1~5 seconds, and the first period can be about 10 minutes.

And, upon reception of information request from the remote control unit 160, the data collecting server 140 can transmit the state information or the operation information on at least one of the outdoor unit 120 and the indoor unit 110 to the remote control unit 160.

The remote control unit 160 analyzes the state information or the operation information on at least one of the outdoor unit 120 and the indoor unit 110 to diagnose malfunction of the outdoor unit or the indoor unit.

Based on information diagnosed thus, the remote control unit 160 can suggest correction of the malfunction of at least one of the outdoor unit and the indoor unit or can transmit a control signal to the data collecting server 140 for correction of the malfunction based on the information diagnosed thus or a preset rule.

Moreover, the gateway 130 and the data collecting server 140 can be connected with an Ethernet.

Figure 3:
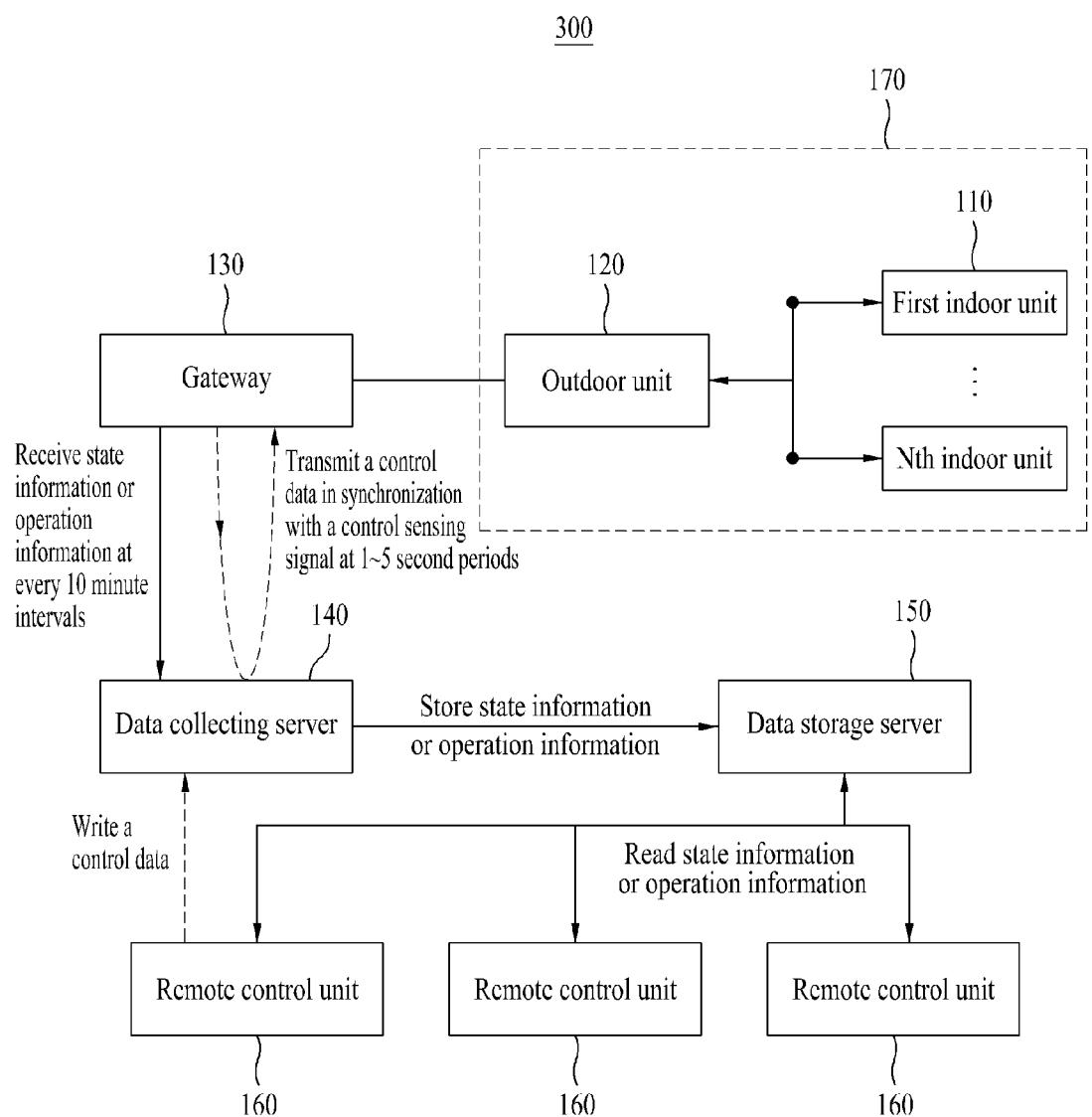
FIG. 3 illustrates a block diagram for describing a method for controlling the system in accordance with a preferred embodiment of the present invention.

FIG. 3 illustrates a block diagram for describing a method for controlling the system in accordance with a preferred embodiment of the present invention.

Referring to FIG. 3, the method for controlling an system for controlling an air conditioner includes the steps of (a) transmitting at least one of state information and operation information concerning at least one of an outdoor unit and an indoor unit of the air conditioner, wherein the information is transmitted at first time periods through a gateway associated with the air conditioner; (b) transmitting a control sensing signal for sensing a control order for controlling the air conditioner, wherein the control sensing signal is transmitted through the gateway at second times periods different from the first time periods; and (c) receiving, at the gateway, a control signal in response to the transmission of the control sensing signal if the control order is sensed.

Also, The method for controlling an air conditioner, includes the steps of: (a) receiving at least one of state information and operation information concerning at least one of an outdoor unit and an indoor unit of the air conditioner, wherein the information is received at first time periods by a data collecting server; (b) receiving a control sensing signal for sensing a control order for controlling the air conditioner, wherein the control sensing signal is received by the data collecting server at second time periods different from the first time periods; and (c) transmitting, by the data collecting server, a control signal in response to the receiving of the control sensing signal if the control order is sensed.

Also, the method for controlling an system for controlling an air conditioner includes the steps of (a) collecting state information or operation information on at least one of an outdoor unit and an indoor unit with a gateway, (b) providing a control sensing signal from the gateway at preset first periods for determining reception of a control order, (c) transmitting information collected with the gateway to a data collecting server at preset second periods, and (d) transmitting a control signal to the gateway in synchronization with the control sensing signal upon reception of the control order.

As described before, the air conditioner has the outdoor unit 120 and the indoor unit 110, and is operated as refrigerant flows between the outdoor unit 120 and the indoor unit 110. For this, the compressor (not shown) in the outdoor unit compresses and discharges the refrigerant to the indoor unit 110, to cause phase changes during the refrigerant circulates through the condenser (heat exchanger), expansion unit, evaporator and so on. Above entire steps are called as a cycle, collectively.

If the air conditioner is out of order, in order to analyze and diagnose the cause of the air conditioner being in out of order, analysis of a cycle data flow with respect to time is required, when, even if a data before the air conditioner becomes out of order is important, the cycle data before the air conditioner becomes out of order is very important.

Since, not only repetitive outputting of the cycle data that shows an abnormal state after the air conditioner becomes out of order, but also reproduction of a state of the air conditioner becoming out of order, is important for cause analysis and countermeasure, real time cycle data monitoring is important for making an analysis time period short.

In order to examine changes of the compressor that rotates at a high speed, and changes of the refrigerant and changes of the cycle caused by the changes of the compressor, a data of a short period is required. That is, for making meaningful monitoring of a data inside of the air conditioning system, a data of the short period in a range of 10 seconds at the longest, and 2 seconds at the shortest is required.

Therefore, if the gateway 130 collects the state information on the indoor unit and the outdoor unit at every long time period, for an example, every one hour, the real time monitoring of the system for controlling an air conditioner can not be possible.

In the meantime, with regard to control of the system for controlling an air conditioner 100, if the user accesses to, for an example, a Web, and gives the control order through the remote control unit 160, the system for controlling an air conditioner stores the control data at the data storage server 150 in succession, determines existence of the control order on the indoor unit and the outdoor unit if the system for controlling an air conditioner receives a monitoring signal on the indoor unit and the outdoor unit, and, if yes, transmits the control order to a relevant facility. In this instance, the control data is transmitted to the gateway 130 in synchronization with the reception of the state information at the data collecting server 140.

Of the methods for controlling the air conditioning system, though there can be a method for controlling the system for controlling an air conditioner 100 locally directly, there can also be a method for controlling the system for controlling an air conditioner 100 remotely. Particularly, in order to control a plurality of branch offices from a main office, or control a facility at a site far from a service center, a remote control system is essential.

Moreover, control on the system for controlling an air conditioner 100 is required to be focused on a user's control time point. That is, it is impossible to pin point a time when the control on the system for controlling an air conditioner 100 takes place, and, if the control time point is not right, user's inconvenience can result in and, moreover, the system for controlling an air conditioner can become out of order.

The system for controlling an air conditioner 300 in accordance with a preferred embodiment of the present invention can include a gateway 130, a data collecting server 140, a data storage server 150, and a remote control unit 160.

The system for controlling an air conditioner 300 collects state information or operation information on the outdoor unit 120 or the indoor unit 110 through the gateway 130 at preset periods. And the information collected thus is transmitted to the data collecting server 140 at preset second periods.

In this instance, it is apparent that the gateway 130 can collect the state information or the operation information on the outdoor unit 120 or the indoor unit 110 at the second periods at which the gateway 130 is required to transmit a data to the data collecting server 140, or can collect the state information or the operation information on the outdoor unit 120 or the indoor unit 110 at periods different from the second periods and transmits the data to the data collecting server 140 at the second periods, or can always have the indoor unit or the outdoor unit connected thereto for making real time collection of the state information or the operation information on the outdoor unit 120 or the indoor unit 110.

For an example, the gateway 130 can collect the state information or the operation information on the outdoor unit 120 or the indoor unit 110 and transmit the same to the data collecting server 140 once at every 10 minute, and the data collecting server 140 can store the information received thus at the data storage server 150.

The state information can include identification code information on the indoor unit and the outdoor unit, setting temperature information on the indoor unit, room temperature information, information on whether the indoor unit and/or the outdoor unit is running or not, mode information and so on, and the operation information can include indoor unit and outdoor unit failure information, information on taking place of errors, and information on regular maintenance visit times.

The remote control unit 160 can receive and analyze the state information on the indoor unit stored in the data storage server 150 or the state information or the operation information on at least one of the outdoor unit 120 and the indoor unit 110 transmitted according to information request from the remote control unit 160 to the data collecting server 140, and can forward the same in a state the user can perceive, and the remote control unit 160 can diagnose malfunction of the outdoor unit or the indoor unit by using information analyzed thus, and can suggest correction of the malfunction of the outdoor unit or the indoor unit based on a result of the diagnosis, or can transmit a control signal to the data collecting server 140 for correcting the malfunction based on the information diagnosed thus or a preset rule.

The gateway 130 can communicate with the outdoor unit 120 and the indoor unit 110 with the RS-485 system of the Serial Communication Protocol to collect the state information or the operation information on the outdoor unit 120 or the indoor unit 110 once at every one hour as a result of the communication. The data collected thus is transmitted instantly to the data collecting server 140 positioned far from the gateway 130 by using the Ethernet Protocol. The transmission can be made by all of the gateways provided at fields throughout the country according to individual operation times non-synchronously.

The system for controlling an air conditioner 300 in accordance with a preferred embodiment of the present invention includes a gateway 130 for monitoring and controlling the outdoor unit and the indoor unit to enable real time control of the air conditioning system, and the gateway 140 enables to maintain all time connection to the data collecting server 140 for enabling the user to make real time control.

That is, in order to secure the real time controllability, the system for controlling an air conditioner 300 collects the state information or the operation information on the outdoor unit 120 or the indoor unit 110 through the gateway 130 at preset second periods (for an example, one at every 10 minute) and transmits the same to the data collecting server 140.

Moreover, not that the gateway 130 receives a control data from the data collecting server 140 in synchronization with information reception at the data collecting server 140 by making connection to the data collecting server 140 only when data transmission and reception is required, but that, in order to reduce a network load on a server while making real time control, in the system for controlling an air conditioner 300 in accordance with a preferred embodiment of the present invention, the gateway 130 transmits the control sensing signal that can process the control signal to the data collecting server 140 at the first periods (for an example, 1~5 second intervals), such that the data collecting server 140 transmits the control signal to the gateway 130 in synchronization with the control sensing signal.

Figure 4:
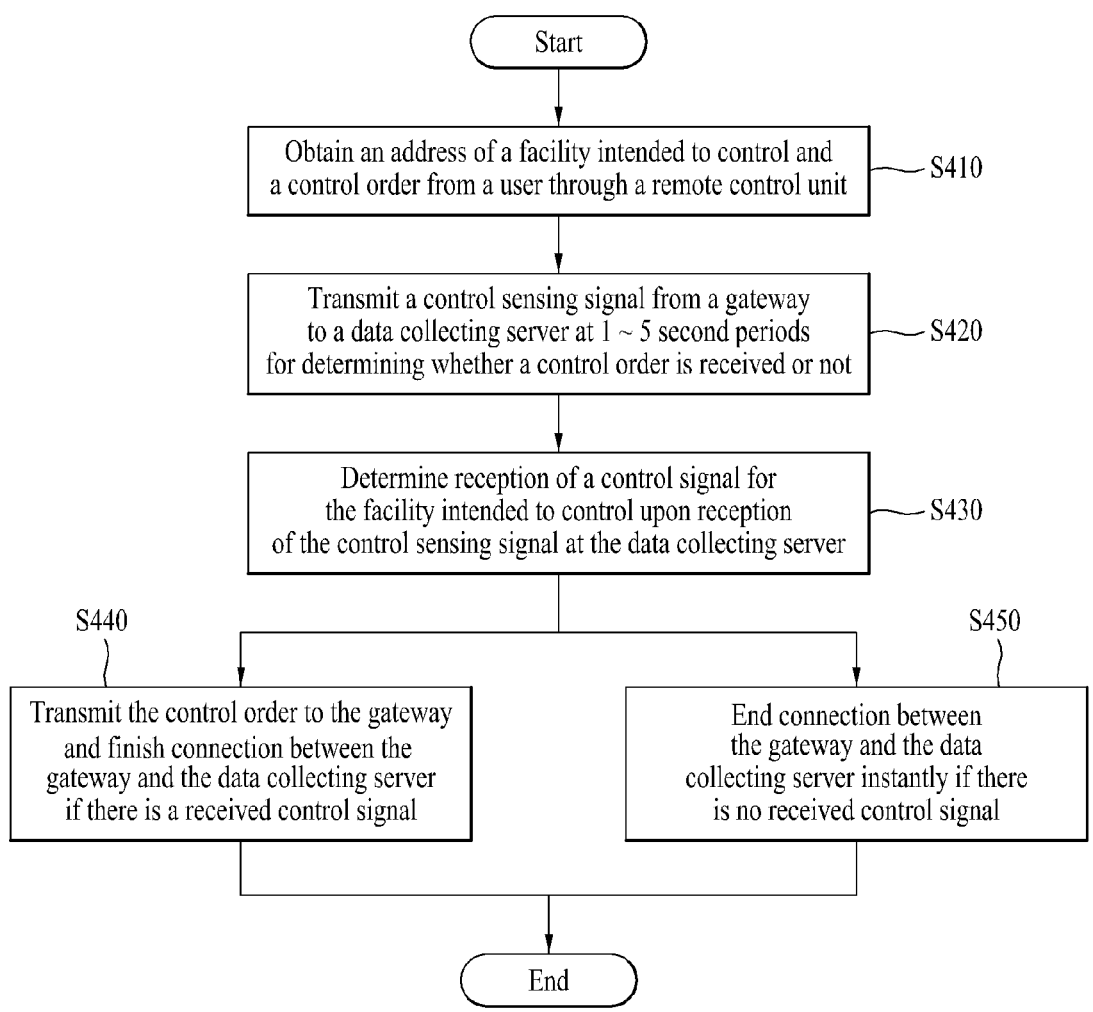
FIG. 4 illustrates a flow chart showing the steps of a method for controlling the system in accordance with a preferred embodiment of the present invention.

FIG. 4 illustrates a flow chart showing the steps of a method for controlling the system in accordance with a preferred embodiment of the present invention.

Referring to FIG. 4, to begin with, the data collecting server 140 obtains an address of a facility intended to control and a control order from a user through a remote control unit 160 (S410), and a gateway 130 transmits a control sensing signal to the data collecting server 140 for determining reception of the control order at 1~5 second periods (a first periods) (S420).

Then, upon reception of the control sensing signal, the data collecting server 140 determines if the control signal for the facility intended to control is received or not (S430).

Then, if there is a received control signal, the data collecting server 140 transmits the control order to the gateway 130, and finishes connection to the gateway 130 (S440). And, if there is no received control signal, the data collecting server 140 ends the connection to the gateway 130, instantly (S450).

Since the system for controlling an air conditioner of the present invention can make real time facility control, system reliability can be maintained.

Moreover, since the system for controlling an air conditioner of the present invention can make real time air conditioner control while minimizing a network load, a load on a server can be minimized and data transmission and reception can be delayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling an air conditioner, comprising the steps of:
   transmitting at least one of state information and operation information concerning at least one of an outdoor unit and an indoor unit of the air conditioner, wherein the information is transmitted at first time periods through a gateway associated with the air conditioner;
   transmitting a control sensing signal for sensing a control order for controlling the air conditioner, wherein the control sensing signal is transmitted through the gateway at second times periods different from the first time periods;
   receiving, at the gateway, a control signal in response to the transmission of the control sensing signal if the control order is sensed; and
   receiving the control signal during a same connection that the control sensing signal is transmitted if the control order is sensed,
   wherein the time between second time periods is shorter than the time between first time periods.

2. The method of claim 1, further comprising ending the connection if the control order is not sensed.

3. The method of claim 1, further comprising collecting the at least one of state information and operation information from the at least one of the outdoor unit and the indoor unit.

4. The method of claim 1, further comprising transmitting the control signal to at least one of the outdoor unit and the indoor unit.

5. The system of claim 1, wherein the state information includes at least one of: identification code information of the outdoor unit and/or the indoor unit; setting temperature information of the indoor unit; room temperature information; information on whether the indoor unit and/or the outdoor unit is running or not; and mode information.

6. The system of claim 1, wherein the operation information includes at least one of: indoor unit and/or outdoor unit failure information; information on occurrences of errors; and information on regular maintenance visits times.

* * * * *